(12) United States Patent
Schmidt

(10) Patent No.: US 10,300,949 B2
(45) Date of Patent: May 28, 2019

(54) WHEELCHAIR CONVERSION VEHICLE WITH A MODIFIED K-FRAME AND A METHOD OF MANUFACTURING THE SAME

(71) Applicant: Vantage Mobility International, LLC, Phoenix, AZ (US)

(72) Inventor: Michael J. Schmidt, Queen Creek, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 269 days.

(21) Appl. No.: 14/914,925

(22) PCT Filed: Sep. 5, 2014

(86) PCT No.: PCT/US2014/054296
§ 371 (c)(1),
(2) Date: Feb. 26, 2016

(87) PCT Pub. No.: WO2015/035166
PCT Pub. Date: Mar. 12, 2015

(65) Prior Publication Data
US 2016/0221607 A1  Aug. 4, 2016

Related U.S. Application Data

(60) Provisional application No. 61/874,252, filed on Sep. 5, 2013.

(51) Int. Cl.
*B62D 21/00* (2006.01)
*B62D 21/11* (2006.01)
(Continued)

(52) U.S. Cl.
CPC ............ *B62D 21/11* (2013.01); *A61G 3/0808* (2013.01); *B62D 65/12* (2013.01)

(58) Field of Classification Search
CPC ...... B60G 3/02; B60G 21/0551; B60G 99/00; B60G 2200/182; B60G 2200/184;
(Continued)

(56) References Cited

U.S. PATENT DOCUMENTS 3,093,390 A * 6/1963 Muller ................... B60G 3/205
267/258
4,248,455 A * 2/1981 Manning ................ B60G 11/27
280/124.109

(Continued)

FOREIGN PATENT DOCUMENTS

WO    2012039665 A1    3/2012

OTHER PUBLICATIONS

PCT International Search Report and Written Opinion for PCT/US2014/054296, dated Dec. 24, 2014, 14 pages.

*Primary Examiner* — Toan C To
(74) *Attorney, Agent, or Firm* — Fennemore Craig, P.C.

(57) ABSTRACT

The present invention is directed to a wheelchair conversion vehicle and a modified rear suspension K-frame that provides an increase in the overall wheelchair accessible area in the conversion vehicle without compromising ride quality or vehicle control. The invention also provides a method of manufacturing such a wheelchair conversion vehicle.

13 Claims, 11 Drawing Sheets

(51) Int. Cl.
*A61G 3/08* (2006.01)
*B62D 65/12* (2006.01)

(58) Field of Classification Search
CPC ............ B60G 2204/15; B60G 2204/41; B60G 2204/43; B60G 2206/60; B60G 2204/1222; B62D 21/11
USPC .......................................... 280/788, 124.109
See application file for complete search history.

(56) References Cited

U.S. PATENT DOCUMENTS

| | | | | |
|---|---|---|---|---|
| 5,088,573 | A * | 2/1992 | Moll | B62D 7/146 |
| | | | | 180/415 |
| 6,071,064 | A * | 6/2000 | Hackett | A61G 3/066 |
| | | | | 414/495 |
| 6,869,090 | B2 * | 3/2005 | Tatsumi | B60G 3/20 |
| | | | | 280/124.109 |
| 8,864,153 | B2 * | 10/2014 | Luttinen | B62D 7/12 |
| | | | | 280/124.109 |
| 8,876,132 | B2 * | 11/2014 | Marchena | B62D 25/08 |
| | | | | 180/311 |
| 9,604,672 | B2 * | 3/2017 | Kaneko | B62D 25/2027 |
| 2002/0113394 | A1* | 8/2002 | Ziech | B60G 7/02 |
| | | | | 280/124.109 |
| 2004/0256827 | A1 | 12/2004 | Walters | |
| 2006/0049603 | A1* | 3/2006 | Katagiri | B60G 7/02 |
| | | | | 280/124.109 |
| 2006/0051191 | A1* | 3/2006 | Dupuy | B60P 1/4457 |
| | | | | 414/522 |
| 2006/0244232 | A1* | 11/2006 | Cortez | B60G 7/00 |
| | | | | 280/124.116 |
| 2010/0052368 | A1 | 3/2010 | Yamaguchi et al. | |
| 2013/0049393 | A1 | 2/2013 | Kurogi et al. | |

* cited by examiner

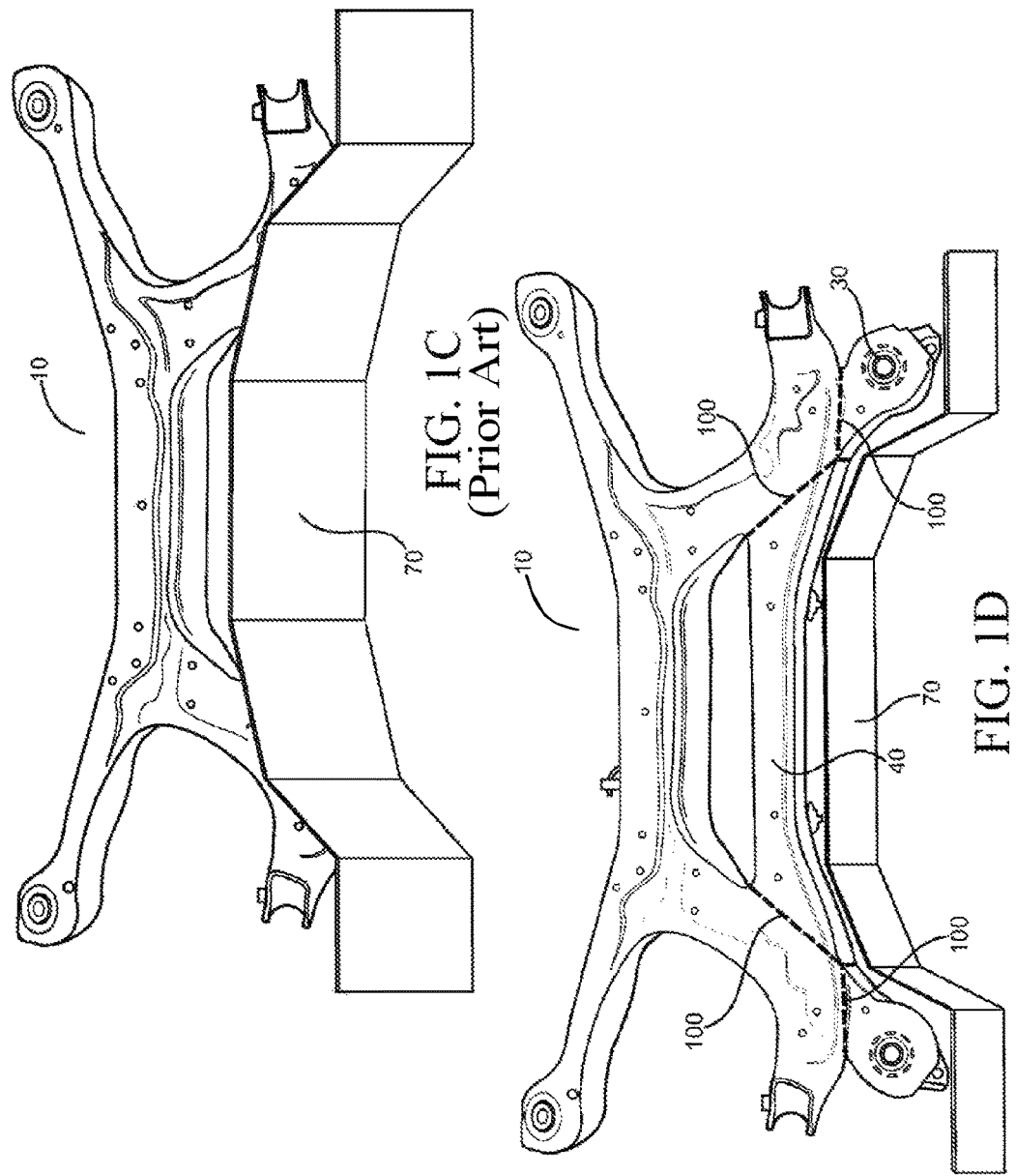

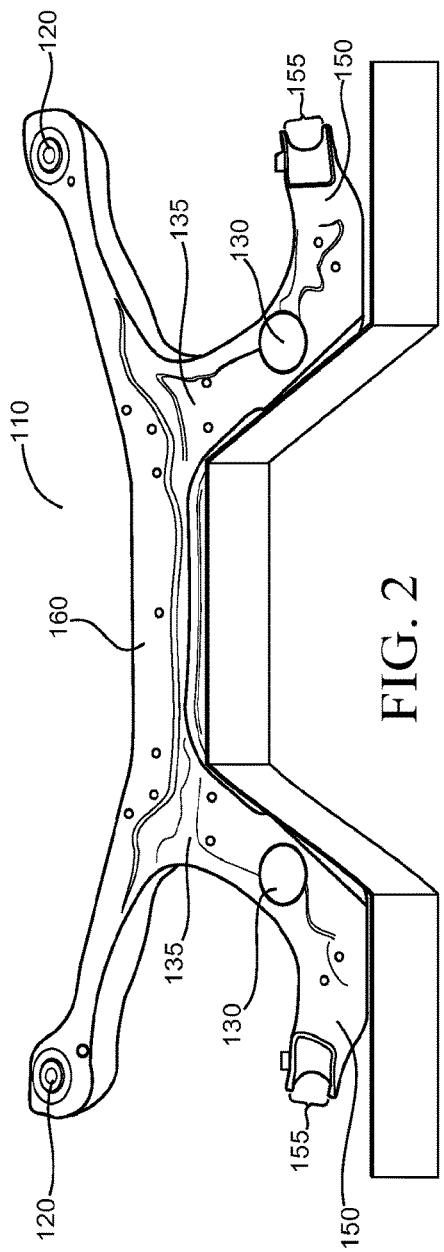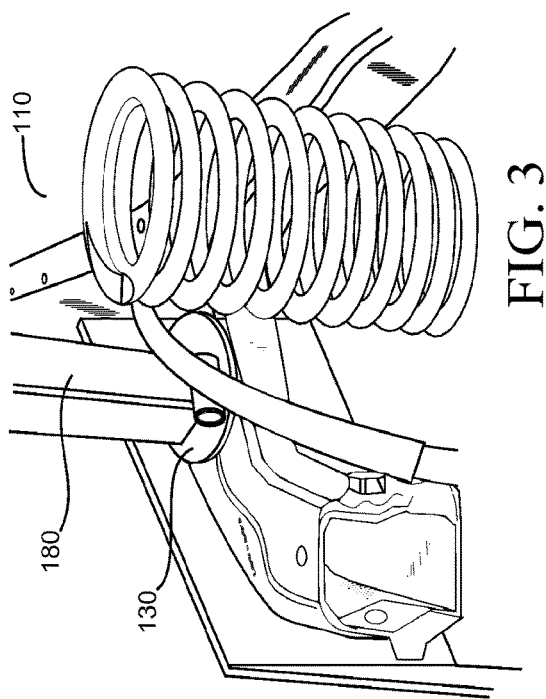

WHEELCHAIR CONVERSION VEHICLE WITH A MODIFIED K-FRAME AND A METHOD OF MANUFACTURING THE SAME

CROSS REFERENCE TO RELATED APPLICATIONS

This application is a U.S. National Stage of PCT Application No. PCT/US2014/054296 filed on Sep. 5, 2014 which claims the benefit of U.S. Provisional Patent Application No. 61/874,252, filed Sep. 5, 2013, both of which are hereby incorporated herein by reference for all that they disclose.

FIELD OF THE INVENTION

The invention relates to wheelchair conversion vehicles that allow easy and convenient access and use for riders in wheelchairs. The invention is also directed to a method of manufacturing wheelchair conversion vehicles with a modified K-frame.

BACKGROUND OF THE INVENTION

It is currently known in the art to modify a vehicle to accommodate for riders in wheelchairs. Example modifications include lowering the floor of the vehicle and providing a ramp for entering and exiting the vehicle. Such modifications allow for people in wheelchairs to more comfortably ride in vehicles. For example, lowering the floor of the vehicle provides a greater floor to ceiling height so that riders will not hit their heads when sitting in a wheelchair.

One desirable modification is an increase in floor length to allow for easy maneuvering while entering and exiting the vehicle, and while positioning the wheelchair within the vehicle. Previous increases in floor length have been limited by the location of the rear independent suspension subframe. The invention described herein increases the limit to floor length by providing a modified independent rear suspension K-frame, a wheelchair conversion vehicle with such a modified K-frame or a purpose built subframe and a method of manufacturing the same.

BRIEF DESCRIPTION OF THE DRAWINGS

Illustrative and exemplary embodiments of the invention are shown in the drawings in which:

FIGS. 1A-D are various views of an existing OEM K-frame with the resulting rear kick-up.

FIG. 2 is a top view of an implementation of a modified K-frame according to the present disclosure.

FIG. 3 is a top perspective view of an implementation of a modified K-frame coupled to a new vehicle mount.

Figures 1A, 1B:
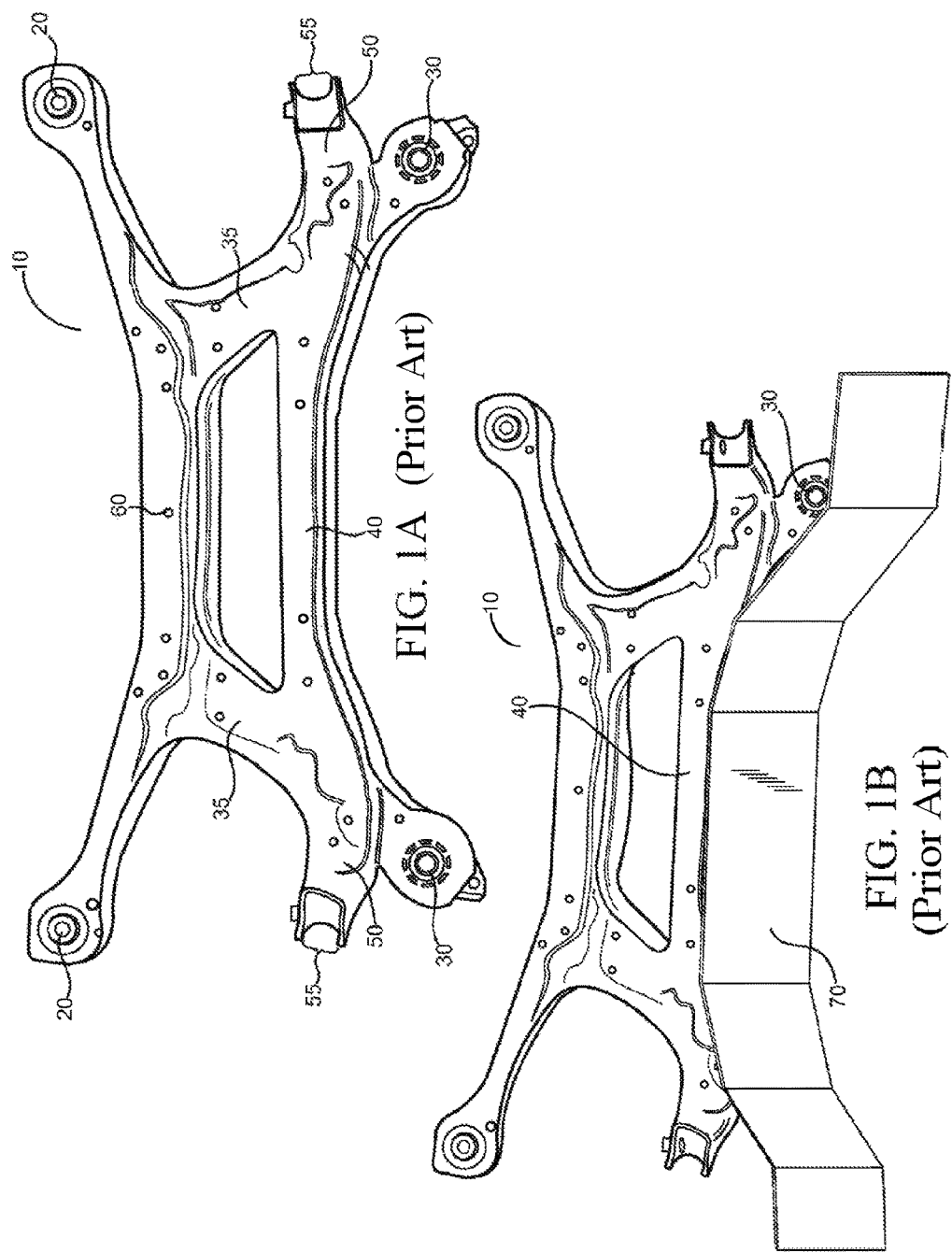

Elements and facts in the figures are illustrated for simplicity and have not necessarily been rendered according to any particular sequence or embodiment.

DESCRIPTION OF THE INVENTION

Aspects and applications of the invention presented here are described below in the drawings and description of the invention. Unless specifically noted, it is intended that the words and phrases in the specification and the claims be given their plain, ordinary, and accustomed meaning to those of ordinary skill in the applicable arts.

The following is a description of the preferred embodiments of the present invention and is not intended to limit the scope of the invention to the particular embodiments discussed below.

As shown in the FIGS., the present invention is directed to a modified K-frame, which is intended for use in the original equipment manufacturer (OEM) independent rear suspension system of a vehicle. The invention is also directed to a converted wheelchair accessible vehicle having an independent rear suspension that contains the modified K-frame as discussed below and to a method for converting an OEM vehicle to a wheelchair accessible vehicle.

Converted wheelchair accessible vehicles have lowered floors to increase headspace for wheelchair users and to accommodate a side access wheelchair ramp system. Wheelchair users are limited to those areas of the vehicle that have a lowered floor. This limitation can make it difficult to maneuver a wheelchair within a vehicle and while entering and exiting the vehicle. Increasing the overall area of lowered floor will increase a wheelchair user's access to and ease of use of a vehicle. One area of the floor that previously could not be lowered is the space consumed by the rear subframe of a vehicle with an independent rear suspension, thus, decreasing the overall wheelchair accessible area in the vehicle. The rear suspension is extremely important, providing both ride quality and vehicle control. A rear kick-up is caused by the location of the rear suspension system in these vehicles, wherein the back portion of the vehicle floor is raised compared to the lowered wheelchair accessible floor.

The modified K-frame set forth in this disclosure allows for an increase in the overall area of the lowered floor so that wheelchair users have more space to maneuver within a converted wheelchair accessible vehicle without compromising ride quality and vehicle control. The invention provides additional floor space while maintaining OEM suspension kinematics/geometry, as well as compatibility with OEM replacement part. In one embodiment, the OEM independent suspension components, such as control arms, spindles, bushings, etc., are used or modified during the conversion.

The OEM K-frame in currently converted wheelchair accessible vehicles requires a rear kick-up. FIG. 1A illustrates an existing OEM K-frame 10, FIGS. 1B, 1C, and 1D illustrate various views of the rear kick-up 70 provided by OEM K-frame 10. The various parts of OEM K-frame 10 are also visible in FIG. LA. Two rear subframe bushings 20 are fixedly connected to opposite ends of a main support beam 60. Two front subframe bushings 30 are fixedly connected to main support beam 60 by two arms 35 that extend from main support beam 60 at an angle. These two arms 35 are fixedly connected to one another by a rear transaxle support beam 40. On the side of arms 35 directly opposite from rear transaxle support beam 40, are brackets 50. On an end of each bracket 50 is a control arm mount 55. Rear kick-up 70 is adjacent to front subframe bushings 30 and rear transaxle support beam 40, as shown in FIGS. 1B-1D.

FIG. 2 presents an embodiment of the present invention, but the invention is not limited to the embodiment shown. In an embodiment, modified K-frame 110 has two rear subframe bushings 120. The two rear subframe bushings 120 are fixedly connected to opposite ends of a main support beam 160. There are preferably about 40" to 60" between rear subframe bushings 120, more preferably about 48" to 52" between rear subframe bushings 120, and most preferably about 49" to 51", e.g., 50.5", between rear subframe bushings 120. In a preferred embodiment, main support beam 160 is slightly curved, and in a more preferred embodiment, main support beam 160 is slightly curved on the ends, but is straight in a middle section. Main support beam 160 is preferably about 0.025" to 0.125" in wall thickness, more preferably about 0.050" to 0.100", and most preferably about 0.070" to 0.080", e.g., 0.075".

Two arms 135 are fixedly connected to main support beam 160 and extend at an angle away from each other such that K-frame 110 resembles the letter K. The angle between the center of main support beam 160 and an arm 135 is preferably between about 90 to 150 degrees. More preferably, the angle is between about 120 to 135 degrees. In a preferred embodiment, arms 135 are symmetrical around the center of main support beam 160 as is the case for the embodiment depicted in FIG. 2. There are preferably between about 10" to 26", more preferably about 12" to 20", and most preferably about 14" and 18", e.g., 16", between the inside surfaces of the two arms 135 where they contact the main support beam 160. In a preferred embodiment, arms 135 are preferably between about 8" and 20", more preferably about 9" to 18", and most preferably about 10" to 16", e.g., 12" long and preferably about 1" to 4", more preferably 1.5" to 3" and most preferably 2" to 2.5", e.g., 2.25" in cross-section height from the bottom to top surface.

Brackets 150 are fixedly connected to the ends of arms 135 opposite to the ends connected to main support beam 160. Control arm mounts 155 are fixedly connected to brackets 150. K-frame 110 also has two front subframe bushings 130. In a preferred embodiment, front subframe bushings 130 are located along arms 135 between main support beam 160 and brackets 150. In a more preferred embodiment, front subframe bushings 130 are located along arms 135 between main support beam 160 and brackets 150 and are closer to brackets 150 than main support beam 160. In a most preferred embodiment, front subframe bushings 130 are located along arms 135 between main support beam 160 and brackets 150 directly adjacent to brackets 150. In an alternative embodiment, front subframe bushings 130 may be located above brackets 150.

Front subframe bushings 130 may be an integral part of arms 135 in the locations described above. More preferably, front subframe bushings 130 are attached to a top surface of arms 135 in the locations described above.

Referring now to FIG. 3, new vehicle mount 180 is structurally attached to the vehicle frame by bolting and/or welding in the four (4) mounting locations of subframe bushings 120 and 130. In a preferred embodiment, new vehicle mount 180 is bolted to the subframe and then welded in place. In a more preferred embodiment, new vehicle mount 180 is bolted to the OEM vehicle and then welded in place. The subframe bushings 120 and 130 may be bolted to the lower end of the new vehicle mounts 180. The new vehicle mount 180 may be attached to the vehicle by welding, bolting, or both. In a preferred embodiment, new vehicle mount 180 is between about 2" and 7" in length. In a more preferred embodiment, new vehicle mount 180 is between about 5" and 6", e.g., 5.5", in length.

Figure 4:
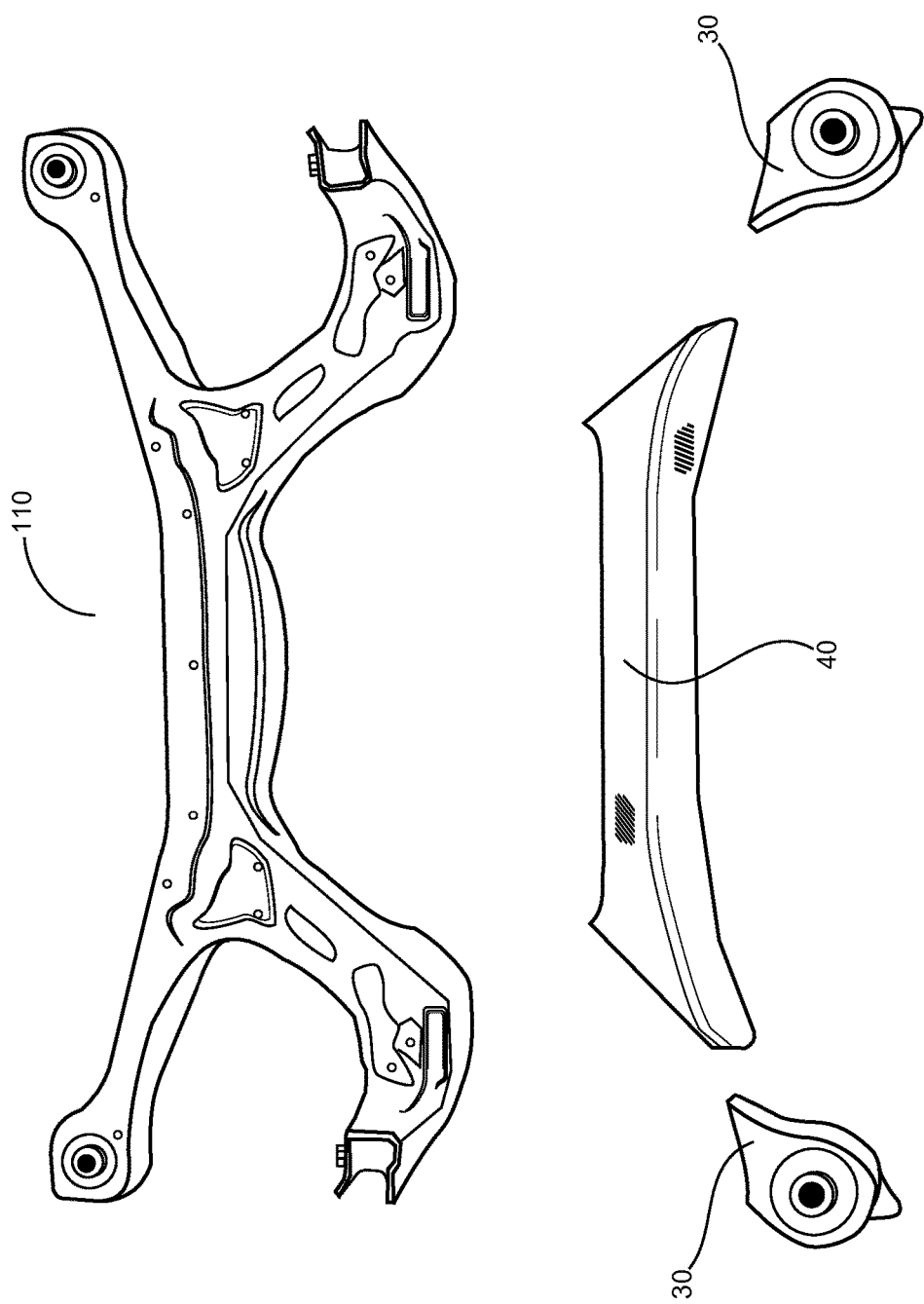
FIG. 4 is a top view of a modified OEM K-frame with front subframe bushings and rear transaxle support beam removed.

In a particular embodiment of the present invention, K-frame 110 does not contain rear transaxle support beam 40 shown in FIG. 1A. K-frame 110 as presented herein may be manufactured as an original part. Alternatively, an OEM K-frame 10 may be modified to create K-frame 110 of the present disclosure. Referring to FIG. 1D, an OEM K-frame 10 may be modified by removing rear transaxle support beam 40 and both front subframe bushings 30 as indicated by the lines 100 in FIG. 1D. FIG. 4 illustrates a modified K-frame 110 with front subframe bushings 30 and rear transaxle support beam 40 removed. The K-frame 110 is further modified by attaching front subframe bushings 130 to a top surface of arms 135, as shown in FIG. 2. The front subframe bushings 130 are attached to arms 135 by welding, bolting, pressing or other mechanical means or a combination of both.

The present invention is also directed to a wheelchair conversion vehicle that allows for easy and convenient access and use for wheelchair users. Although not shown, the wheelchair conversion vehicle is a vehicle that includes K-frame 110 as discussed above. The vehicle's independent rear suspension, including K-frame 110 is attached to the vehicle's body by way of the new vehicle mount 180. Preferably, new vehicle mount 180 is welded to the subframe of the vehicle. More preferably, new vehicle mount 180 is bolted to the subframe. Most preferably, new vehicle mount 180 is both bolted and welded to the subframe. The subframe is connected to the vehicle body. However, in a more preferred embodiment, new vehicle mount 180 is bolted to the vehicle body instead of the subframe. In a most preferred embodiment, new vehicle mount 180 is bolted to the vehicle body and then welded in place. In a preferred embodiment, the vehicle body is a van; in a more preferred embodiment, the vehicle body is a minivan.

In a preferred embodiment, the wheelchair conversion vehicle also comprises a wheelchair access system, which gives a wheelchair user access to the wheelchair conversion vehicle. In a more preferred embodiment, the wheelchair access system includes a side access ramp and a lowered floor.

Figure 5A:
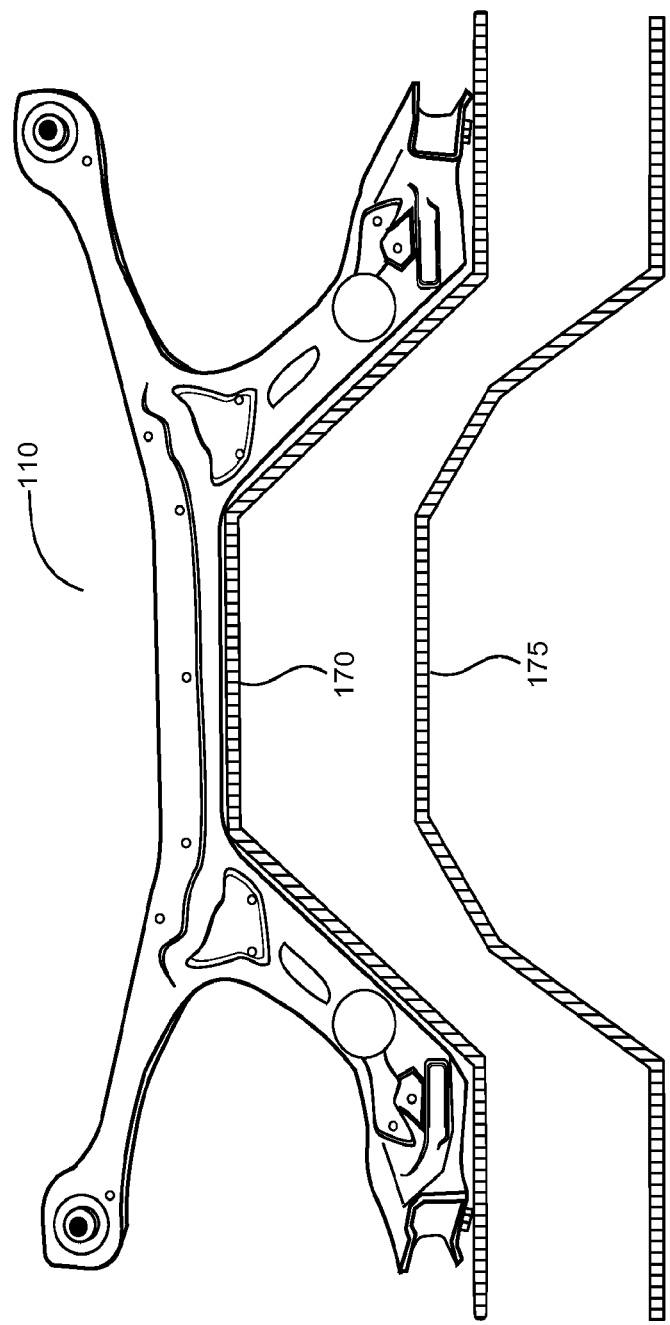
FIGS. 5A-C are various views of an implementation of a modified K-frame according to the present disclosure with the resulting rear kick-up.
Figure 5B:
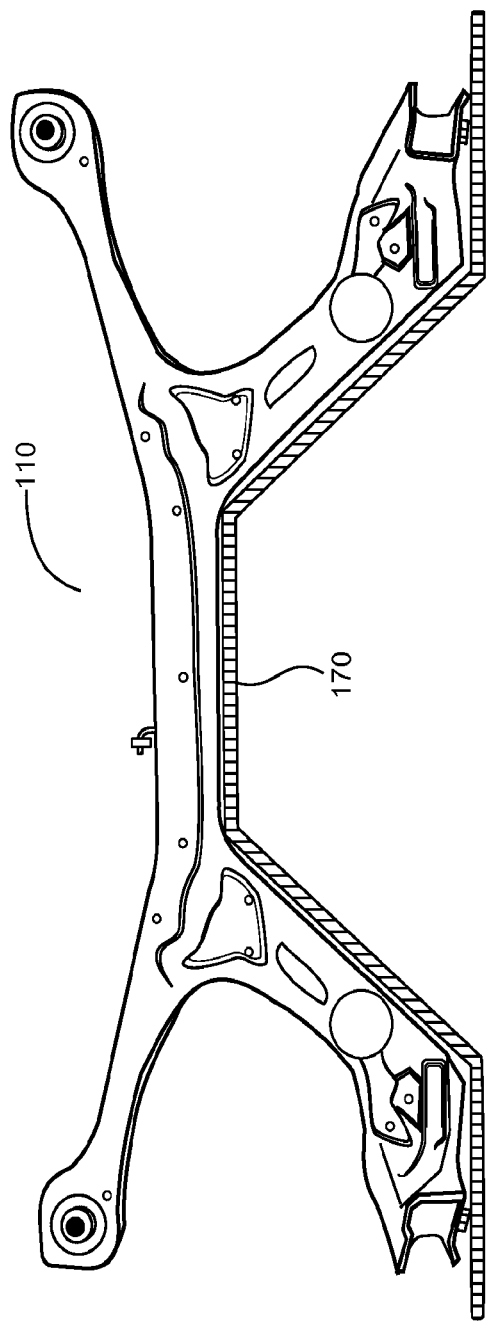
Figure 5C:
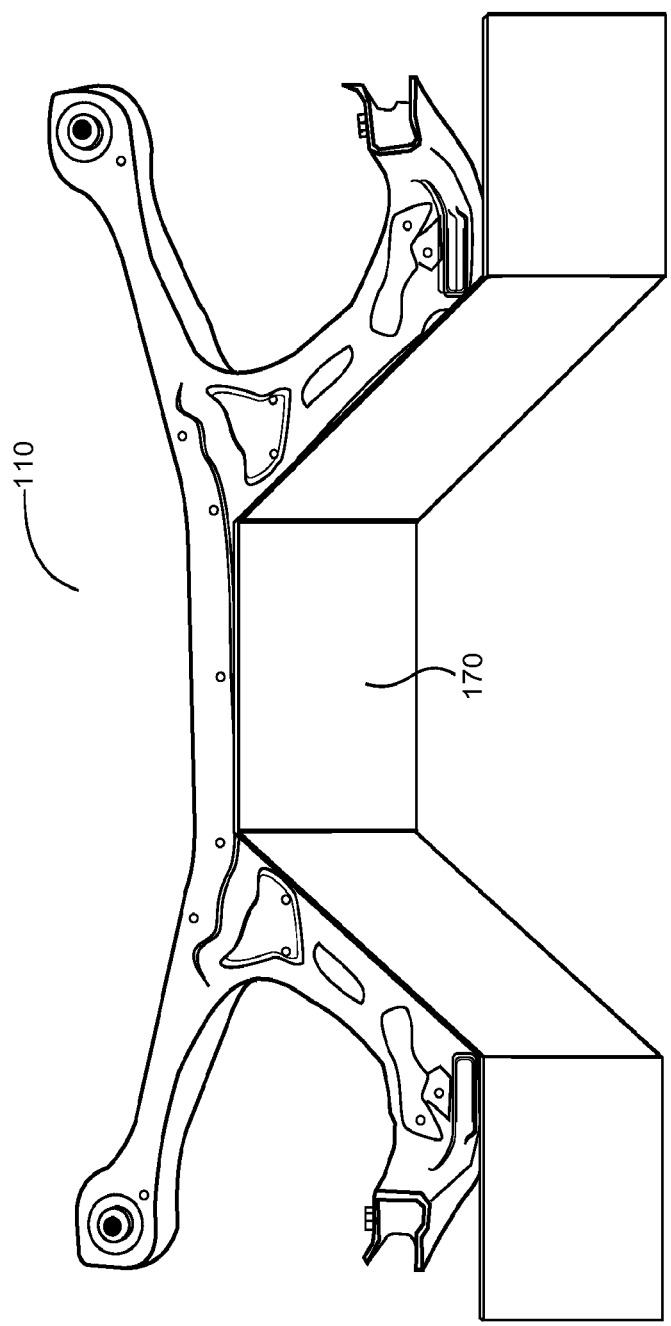

The area of the floor that is lowered determines the amount of space a wheelchair user has in the wheelchair conversion vehicle. Floor length is one parameter that defines the amount of space. Overall interior floor length is determined by measuring from the front kick-up of the interior to the rear kick-up. The rear kick-up 170 created by modified K-frame 110 is illustrated in FIGS. 5A-5C. FIG. 5A also includes a line 175 indicating the location of the rear kick-up 70 from OEM K-frame 10. In a preferred embodiment of the present invention, the overall interior floor length is extended about 2" to 4" because of K-frame 110. In a more preferred embodiment, the overall interior floor length is extended about 4" to 6" because of K-frame 110. In a most preferred embodiment, the overall interior floor length is extended about 6" to 9", e.g., 7" or 8", because of K-frame 110.

The method of manufacturing a wheelchair conversion vehicle described herein primarily involves installing a K-frame 110 as disclosed herein and lowering the area of vehicle floor that extends from the front kick-up of the vehicle to the rear kick-up 170 created by K-frame 110. Manufacturing a wheelchair conversion vehicle begins with an OEM vehicle having a vehicle body, a subframe, and an independent rear suspension. The vehicle body is preferably a van and more preferably a minivan. Other vehicle bodies may be used and are still within the scope of the present invention.

The OEM K-frame 10 is removed from the independent rear suspension. In one embodiment, the OEM K-frame 10 is converted to K-frame 110, illustrated in FIG. 5A, and reinstalled into the independent rear suspension. In an alternative embodiment, OEM K-frame 10 is discarded, and an original K-frame 110, illustrated in FIG. 5A and described above, is installed in its place. For example, the new vehicle mount 180 is attached (e.g., bolted, welded, or both) to the vehicle subframe. Then, the K-frame 110 with each subframe bushing 120 and 130 is attached (e.g., bolted, welded, or both) to the new vehicle mount 180. Alternatively, the K-frame 110 could be inserted by attaching one end of new vehicle mount 180, shown in FIG. 3, to each subframe bushing 120 and 130, and then welding or bolting the second end of new vehicle mount 180 to the vehicle subframe. The second end of new vehicle mount 180 could also be both welded and bolted to the vehicle subframe. The vehicle subframe is attached to the vehicle body. In a more preferred embodiment, the second end of new vehicle mount 180 is bolted directly to the vehicle body. Most preferably, the second end of new vehicle mount 180 is subsequently welded in place.

The vehicle floor is lowered in the area that extends from the front kick-up of the vehicle to the rear kick-up 170 shown in FIGS. 5A-C. In a preferred embodiment, the length of the lowered floor is greater than it would be with the OEM K-frame 10. In a more preferred embodiment, the length of the lowered floor is extended about 2" to 7". In a most preferred embodiment, the length of the lowered floor is extended about 6" to 12", or about 7" to 9". FIG. 5A indicates the location of the previous rear kick-up 70 with a line 175, which illustrates the increase in floor length.

Figure 6:
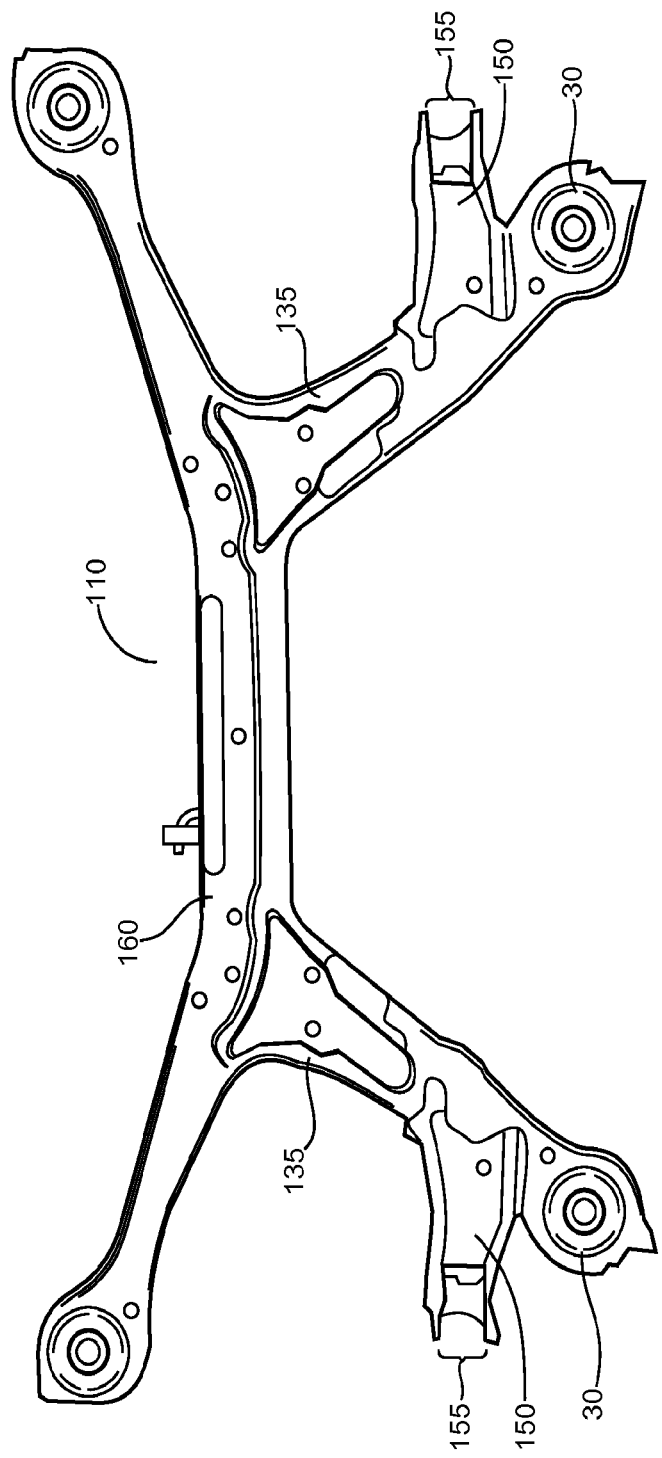
FIG. 6 is a top view of an implementation of an alternative modified K-frame according to the present disclosure.

FIG. 6 provides a top view of an implementation of a/n alternative modified K-frame according to the present disclosure. In this alternative embodiment, the OEM K-frame 110 does not contain rear transaxle support beam 40 shown in FIG. 1A, but does include the two OEM front subframe bushings 30 fixedly connected to main support beam 160 by two arms 135 that extend from main support beam 160 at an angle. On the side of arms 135 directly opposite from the removed rear transaxle support beam 40, are brackets 150. On an end of each bracket 150 is a control arm mount 155. The alternative modified K-frame provides increased center section floor length.

Figure 7:
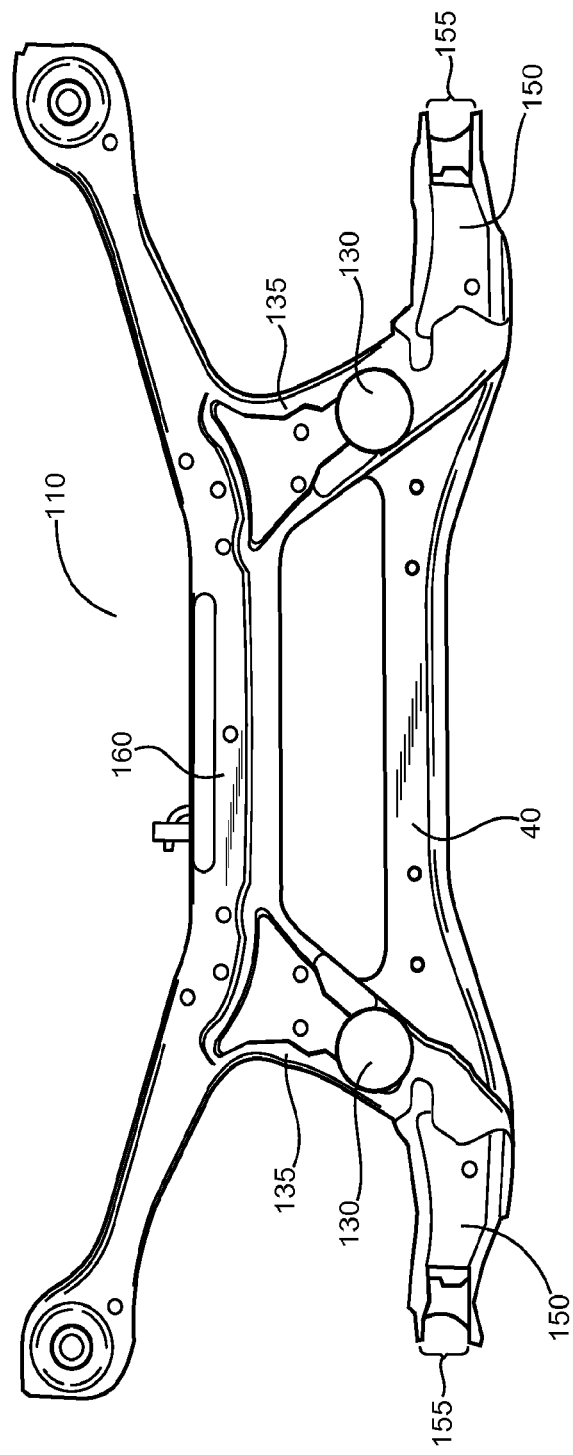
FIG. 7 is a top view of an implementation of a second alternative modified K-frame according to the present disclosure.

FIG. 7 is yet another alternative embodiment showing a top view of an implementation of a second alternative modified K-frame according to the present disclosure. In this second alternative embodiment, the OEM K-frame 110 contains a rear transaxle support beam 40 shown in FIG. 1A, but does not include the two OEM front subframe bushings 30 fixedly connected to main support beam 160 by two arms 135 that extend from main support beam 160 at an angle. These two arms 135 are fixedly connected to one another by a rear transaxle support beam 40. On the side of arms 135 directly opposite from rear transaxle support beam 40, are brackets 150. On an end of each bracket 150 is a control arm mount 155. As in FIG. 2, the brackets 150 are fixedly connected to the ends of arms 135 opposite to the ends connected to main support beam 160. Control arm mounts 155 are fixedly connected to brackets 150. As in FIG. 2, in the second alternative modified K-frame, front subframe bushings 130 are located along arms 135 between main support beam 160 and brackets 150. In a more preferred embodiment, front subframe bushings 130 are located along arms 135 between main support beam 160 and brackets 150 and are closer to brackets 150 than main support beam 160. In a most preferred embodiment, front subframe bushings 130 are located along arms 135 between main support beam 160 and brackets 150 directly adjacent to brackets 150. In an alternative embodiment, front subframe bushings 130 may be located above the brackets 150.

Front subframe bushings 130 may be an integral part of arms 135 in the locations described above. Front subframe bushings 130 may also be attached to a top surface of arms 135 in the locations described above.

The second alternative modified K-frame allows the rear kick-up 70 to be moved further back in the vehicle providing for increased floor length, however, less overall floor space than the modified K-frame as shown in FIG. 5A.

Figure 8A:
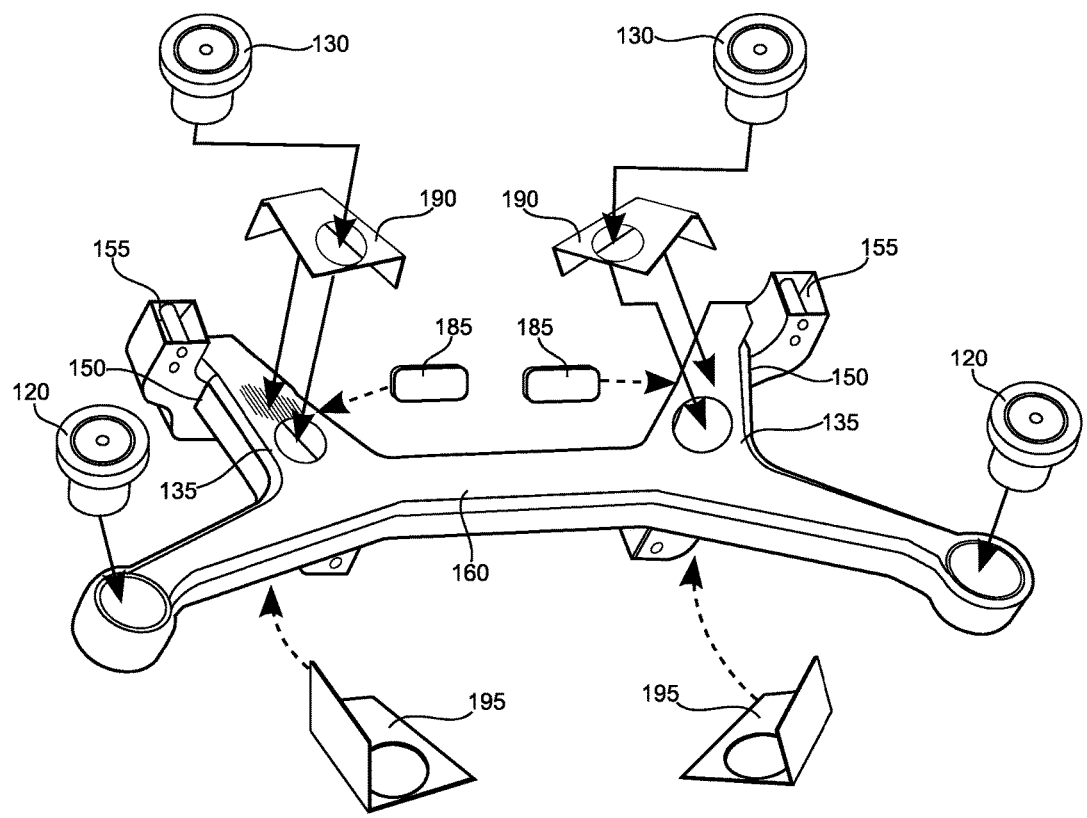
FIGS. 8A-B are two views of an implementation of an alternative modified K-frame according to the present disclosure with strengthening elements added.
Figure 8B:
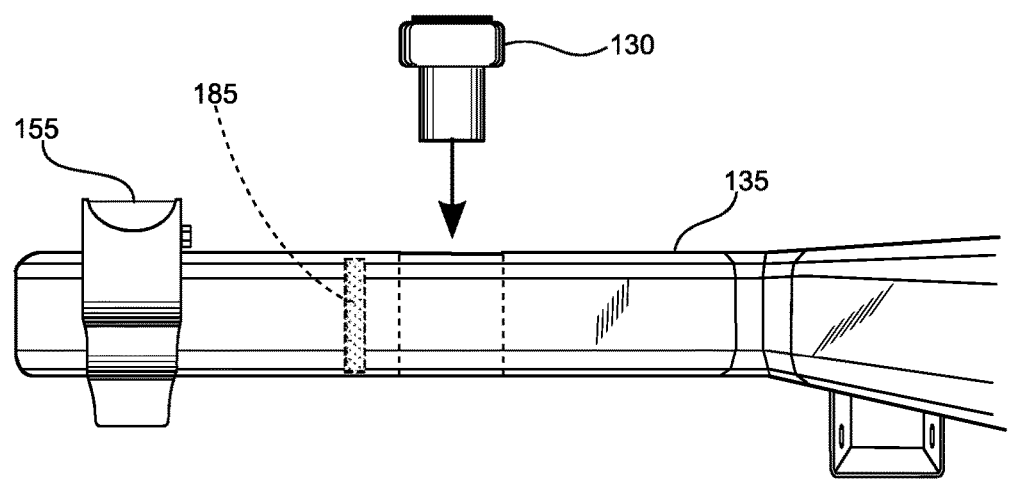

FIGS. 8A-B provide a top and side view of an implementation of an alternative modified K-frame according to the present disclosure. Structural strengthening elements may be added to K-frame 110 to improve performance. For example, gussets 185, top jacket 190, and bottom jacket 195 (collectively jackets 190/195) may be added to increase the strength of K-frame 110 to static and dynamic forces such as torsion during vehicle operation. Gussets 185 and jackets 190/195 may be welded, riveted, or bolted to various sections of K-frame 110. For example, FIG. 8A depicts an example of jackets 190/195 wrapping around arms 135 near front subframe bushings 130, and also depicts gussets 185 installed within the interior cavity of arms 135. Strengthening elements may also be added on or in main support beam 160, brackets 150, control arm mounts 155, and rear transaxle support beam 40. In particular, gussets 185 can be installed within the cavities of K-frame 110 structures (as shown in FIG. 8B) or on the surface of flat surfaces of K-frame 110.

The modified K-frames all surprisingly provide OEM ride quality, but allow for increased floor space for the wheelchair passenger. Each of the modified K-frames shown, including the alternative modified K-frames as shown in FIGS. 6 through 8A-B, can be produced by either modifying an OEM K-frame or alternatively manufacturing an original modified K-frame with no need for modification, e.g., a newly built replacement K-frame weldment, not derived from an OEM K-frame.

In connection with this method of manufacturing, the vehicle can be further converted into a wheelchair accessible vehicle. For example, a wheelchair access system having a side access wheelchair ramp may be installed on the vehicle. Other conversions and features known in the art may be utilized in conjunction with the method described here and are within the scope of the present disclosure.

Upon reading the teachings of this specification, those with ordinary skill in the art will appreciate that, under certain circumstances, considering issues such as changes in technology, user requirements, etc., a variety of fastening devices may be used to "affix", "couple", and/or "releasably couple" (as those words are used herein) one or more components of the present invention. These fastening devices may include one or more of the following: adhesives, bolts, buckles, clasps, latches, locks, screws, snaps, clamps, connectors, couplings, ties, or other fastening means yet to be developed.

The invention is therefore not to be limited to the particular embodiments described and illustrated herein. Although the foregoing describes the preferred embodiments of this invention, it will be understood that the broadest scope of this invention includes modifications. Such scope is limited only by the claims below as read in connection with the above specification. Moreover, many additional advantages of the present invention will be apparent to those skilled in the art in view of the above specification and claims herein.

The following example is non-limiting and illustrates one embodiment of the present invention.

EXAMPLE

Conversion of 2007 Honda Odyssey

A Honda Odyssey was obtained having an independent rear suspension with an OEM K-frame 10. The OEM K-frame 10 was modified by removing the rear transaxle support beam 40 and the front subframe bushings 30. Front subframe bushings 130 were inserted on a top surface of the arms 135 of the K-frame 110. New vehicle mounts 180 were welded onto the vehicle in the four locations corresponding to subframe bushings 120 and 130. The front and rear subframe bushings 130 and 120 and the modified K-frame 110 were bolted into the vehicle.

After OEM K-frame 10 was converted to modified K-frame 110, the remainder of the Honda Odyssey was converted into a wheelchair accessible vehicle. The vehicle floor was lowered and a wheelchair access ramp system was installed.

The resulting floor length at its greatest length in the Honda Odyssey reached 99.5". This is an increase of 8" from the previous floor length of 91.5" in an area corresponding to rear transaxle support beam 40. In the area corresponding to front subframe bushings 30, the floor length was extend by 6".

What is claimed is:

1. A method of manufacturing a wheelchair conversion vehicle comprising:
   providing a vehicle body, a vehicle subframe connected to the vehicle body, an independent rear suspension comprising a modified rear suspension K-frame comprising a main support beam, at least two arms fixedly connected to the main support beam, at least two front subframe bushings located on a top surface of the at least two arms, and a vehicle mount fixedly connected to the at least two front subframe bushings;
   coupling the independent rear suspension fixedly to the vehicle body by way of the vehicle mount; and
   installing a wheelchair access system to provide wheelchair access to the wheelchair conversion vehicle.

2. A wheelchair conversion vehicle comprising:
   a vehicle body;
   a vehicle subframe coupled to the vehicle body;
   an independent rear suspension comprising a modified rear suspension K-frame comprising:
      a main support beam;
      at least two arms fixedly connected to the main support beam;
      at least two front subframe bushings located on a top surface of the at least two arms; and
      a vehicle mount fixedly connected to the at least two front subframe bushings, wherein the independent rear suspension is fixedly connected to the vehicle body by way of the vehicle mount; and
   a wheelchair access system to provide wheelchair access to the wheelchair conversion vehicle.

3. The wheelchair conversion vehicle of claim 2, further comprising a bracket fixedly connected to an end of each of the at least two arms, wherein the end is farthest away from the main support beam.

4. The wheelchair conversion vehicle of claim 2, wherein the at least two front subframe bushings located on the top surface of the at least two arms are an integral part of the at least two arms.

5. The wheelchair conversion vehicle of claim 2, wherein the vehicle has increased floor space compared to the OEM vehicle, while retaining the use of the OEM ancillary rear suspension components, including control arms, joints, bushings, wheel alignment adjustment components in order to maintain OEM suspension kinematics.

6. The wheelchair conversion vehicle of claim 2, further comprising a strengthening element fixedly connected to the modified rear suspension K-frame.

7. The wheelchair conversion vehicle of claim 6, wherein the strengthening element is at least one gusset or jacket fixedly connected to the at least two arms.

8. A rear suspension assembly, comprising:
   a main support beam having a front side, a back side, a first end, and a second end;
   a first rear subframe bushing mounted at about the first end of said main support beam;
   a second rear subframe bushing mounted at about the second end of said main support beam;
   a first arm mounted at about the first end of said main support beam so that said first arm extends generally outwardly from the front side of said main support beam;
   a second arm mounted at about the second end of said main support beam so that said second arm extends generally outwardly from the front side of said main support beam;
   a support beam mounted to said first and second arms so that said support beam is in generally parallel, spaced-apart relation to said main support beam;
   a first front subframe bushing mounted to said rear suspension assembly so that said first front subframe bushing is located at a position forward of said first rear subframe bushing; and
   a second front subframe bushing mounted to said rear suspension assembly so that said second front subframe bushing is located at a position forward of said second rear subframe bushing.

9. The rear suspension assembly of claim 8, further comprising a first control arm mount connected to said first arm and a second control arm mount connected to said second arm.

10. The rear suspension assembly of claim 9, wherein said first control arm mount is generally aligned with said first front subframe bushing and wherein said second control arm mount is generally alined with said second front subframe bushing.

11. The rear suspension assembly of claim 8, wherein said first and second arms make an angle of about 90° with respect to said main support beam.

12. The rear suspension assembly of claim 8, wherein said first front subframe bushing is integral with said first arm and wherein said second front subframe bushing is integral with said second arm.

13. The rear suspension assembly of claim 8, wherein said first front subframe bushing is mounted to a top surface of said first arm and wherein said second front subframe bushing is mounted to a top surface of said second arm.

* * * * *

UNITED STATES PATENT AND TRADEMARK OFFICE
CERTIFICATE OF CORRECTION

PATENT NO. : 10,300,949 B2
APPLICATION NO. : 14/914925
DATED : May 28, 2019
INVENTOR(S) : Michael J. Schmidt It is certified that error appears in the above-identified patent and that said Letters Patent is hereby corrected as shown below:

In the Claims

Claim 5, Column 8, Line 9: After bushings, insert --and--.

Claim 10, Column 8, Line 53: Delete "alined" and insert --aligned--.

Signed and Sealed this
Thirtieth Day of July, 2019

Andrei Iancu
*Director of the United States Patent and Trademark Office*